United States Patent
Kapoor et al.

(10) Patent No.: US 7,350,014 B2
(45) Date of Patent: Mar. 25, 2008

(54) CONNECTING PEER ENDPOINTS

(75) Inventors: Randeep S. Kapoor, Chandler, AZ (US); Mohamad Rooholamini, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 243 days.

(21) Appl. No.: 10/982,132

(22) Filed: Nov. 5, 2004

(65) Prior Publication Data

US 2006/0101185 A1 May 11, 2006

(51) Int. Cl.
G06F 13/36 (2006.01)
G06F 15/167 (2006.01)
G06F 15/16 (2006.01)

(52) U.S. Cl. ............ 710/308; 709/212; 709/237

(58) Field of Classification Search ........ 710/308; 709/212, 237
See application file for complete search history.

(56) References Cited

U.S. PATENT DOCUMENTS

| | | | | |
|---|---|---|---|---|
| 4,991,204 A * | 2/1991 | Yamamoto et al. | .... | 379/221.01 |
| 5,317,566 A * | 5/1994 | Joshi | .......... | 370/238 |
| 5,590,128 A * | 12/1996 | Maloney et al. | .......... | 370/260 |
| 5,822,309 A * | 10/1998 | Ayanoglu et al. | .......... | 370/315 |
| 6,321,271 B1 * | 11/2001 | Kodialam et al. | .......... | 709/241 |
| 6,412,027 B1 * | 6/2002 | Amrany et al. | .......... | 710/22 |
| 6,496,503 B1 * | 12/2002 | Pelissier et al. | .......... | 370/389 |
| 6,701,405 B1 * | 3/2004 | Adusumilli et al. | ........ | 710/308 |
| 6,757,255 B1 * | 6/2004 | Aoki et al. | .......... | 370/252 |
| 7,031,322 B1 * | 4/2006 | Matsuo | .......... | 370/395.4 |
| 7,260,661 B2 * | 8/2007 | Bury et al. | .......... | 710/106 |
| 2002/0188657 A1 * | 12/2002 | Traversat et al. | .......... | 709/201 |
| 2003/0033427 A1 * | 2/2003 | Brahmaroutu | .......... | 709/238 |
| 2004/0001490 A1 * | 1/2004 | Shima | .......... | 370/395.2 |
| 2005/0027788 A1 * | 2/2005 | Koopmans et al. | .......... | 709/200 |
| 2006/0075057 A1 * | 4/2006 | Gildea et al. | .......... | 709/212 |

OTHER PUBLICATIONS

David Mayhew and Norm Rasmussen, "PCI Express and Advanced Switching: Evolutionary Path to Revolutionary Architectures", Sep. 25, 2003, Advanced Switching Interconnect SIG (included with Applicant's IDS).*
Microsoft Computer Dictionary, Fifth Edition, 2002, Microsoft Corporation, p. 193.*
"Advanced Switching Technology Tech Brief", ASI SIG Administration, retrieved from the Internet on Nov. 27, 2007 at http://www.picmg.org/pdf/ASI_AdvSwitch_TB_0216.pdf.*

(Continued)

*Primary Examiner*—Mark H. Rinehart
*Assistant Examiner*—Faisal Zaman
(74) *Attorney, Agent, or Firm*—Trop, Pruner & Hu, P.C.

(57) ABSTRACT

In one embodiment, the present invention includes a method for sending a connection request from a requestor endpoint to a target endpoint based on route information stored in the requestor endpoint, and receiving a connection confirmation from the target endpoint to confirm establishment of a peer-to-peer connection between the endpoints. The endpoints may be part of an Advanced Switching (AS) for Peripheral Component Interconnect (PCI) Express™ architecture, and in one embodiment a simple load store (SLS) protocol may be used for peer-to-peer communications in the AS environment. Other embodiments are described and claimed.

21 Claims, 5 Drawing Sheets

OTHER PUBLICATIONS

Rooholamini, Mo, Intel Corporation, "Advanced Switching: A New Take on PCI Express", Oct. 14, 2004 issue of EDN, Reed Electronics Group.*

Kumar et al., "Advanced Switching Based on PCI Express Specification Ratified", Feb./Mar. 2004, Technology @ Intel Magazine, Intel Corporation.*

Mayhew, David and Norm Rasmussen. PCI Express and Advanced Switching: Evolutionary Path to Revolutionary Architectures. *ASI SIG White Papers*. Sep. 25, 2003. pp. 1-10. www.asi-sig.org/education/whitepapers/Stargen.pdf.

Advanced Switching for the PCI Express Architecture. *Intel Corporation White Papers*. Jan. 1, 2003. pp. 1-12. (http://www.intel.com/technology/pciexpress/devnet/AdvancedSwitching.pdf).

Kumar, Rajeev. Message from the President. *ASI SIG Newsletter*. Sep. 30, 2004. vol. 1, Issue 4. (http://www.asi-sig.org/press/newsletter/volume1_issue4/volume1_issue4).

* cited by examiner

CONNECTING PEER ENDPOINTS

BACKGROUND

The present invention relates to data communication, and more particularly to communications between endpoint devices.

As computing and communications converge, the need for a common interconnect interface increases. Currently, significant resources are devoted to the development of costly, proprietary, customized solutions to enable these environments to interoperate and co-exist. Meanwhile, there is pressure to reduce time-to-market and cut development costs. To this end, a single commonly applied input/output (I/O) interface will likely become "standard" in the converging computing and communications environment.

Over time, computing has evolved around a single board-level interconnect (for example, the current de facto interconnect is the Peripheral Component Interconnect (PCI) in accordance with the PCI Specification, Rev. 2.1 (published Jun. 1, 1995)), while the communications industry has used many board-level and system-level interconnects, some proprietary, with others based on standards such as PCI. As the two areas converge, such different interconnect technologies create complexity in interoperability, coding, and physical design, all of which drive up costs. The use of fewer, common interconnects will simplify the convergence process and benefit infrastructure equipment developers.

Industry-standard interconnects that can be reused among multiple platforms aid in modular system design. Common chip-to-chip interconnects enable reuse of designs across boards, and improve interoperability between computing and communication functions. A common system fabric enables board-level modularity by standardizing the switching interfaces between various components of a modular system. Fewer, common interconnects also reduce complexity in software and hardware, and simplify system design.

The convergence trends of the compute and communications industries, along with inherent limitations of bus-based interconnect structures, has lead to the recent emergence of serial-based interconnect technologies. Serial interconnects reduce pin count, simplify board layout, and offer speed, scalability, reliability and flexibility not possible with parallel busses, such as PCI and PCI-X (in accordance with the PCI-X Specification, version 2.0 (published Jul. 22, 2002)) buses. These new technologies range from proprietary interconnects for core network routers and switches to standardized serial technologies, applicable to computing, embedded applications and communications.

One such standardized serial technology is the PCI Express™ architecture in accordance with the PCI Express™ Bus Specification, version 1.0a (published July 2002). The PCI Express™ architecture is targeted as the next-generation chip-to-chip interconnect for computing. In addition to providing a serial-based interconnect, the PCI Express™ architecture supports functionalities defined in the earlier PCI and PCI-X bus-based architectures. A need exists for extensions to the PCI Express™ architecture that enable greater convergence between compute and communications platforms, as well as enabling peer endpoints of such platforms to effectively communicate via a peer-to-peer protocol.

DETAILED DESCRIPTION

In various embodiments, different devices may be interconnected via a serial-based interconnect scheme. Endpoint (EP) devices may communicate via peer-to-peer connections based on route information stored within the EPs themselves. While various serial-based interconnects may be implemented, in one embodiment an Advanced Switching (AS) for PCI Express™ architecture may be implemented. Such an AS layer may support existing PCI-based protocols, as well as provide protocols for communications platforms.

The Advanced Switching architecture provides a native interconnect solution for multi-host, peer-to-peer communications without additional bridges or media access control. AS employs a packet-based transaction layer protocol that operates over the PCI Express™ physical and data link layers. In such manner, Advanced Switching provides enhanced features such as sophisticated packet routing, congestion management, multicast traffic support, as well as fabric redundancy and fail-over mechanisms to support high performance, highly utilized, and high availability system environments.

AS is media and switching fabric agnostic, meaning the AS protocol functions the same, regardless of the underlying media and switching fabric implementation. Furthermore, AS can support various underlying communication protocols via protocol encapsulation. For example, AS includes internal protocol interfaces that can be used to tunnel protocols such as Ethernet, Fibre Channel, InfiniBand, and PCI-X, among others.

Figure 1:
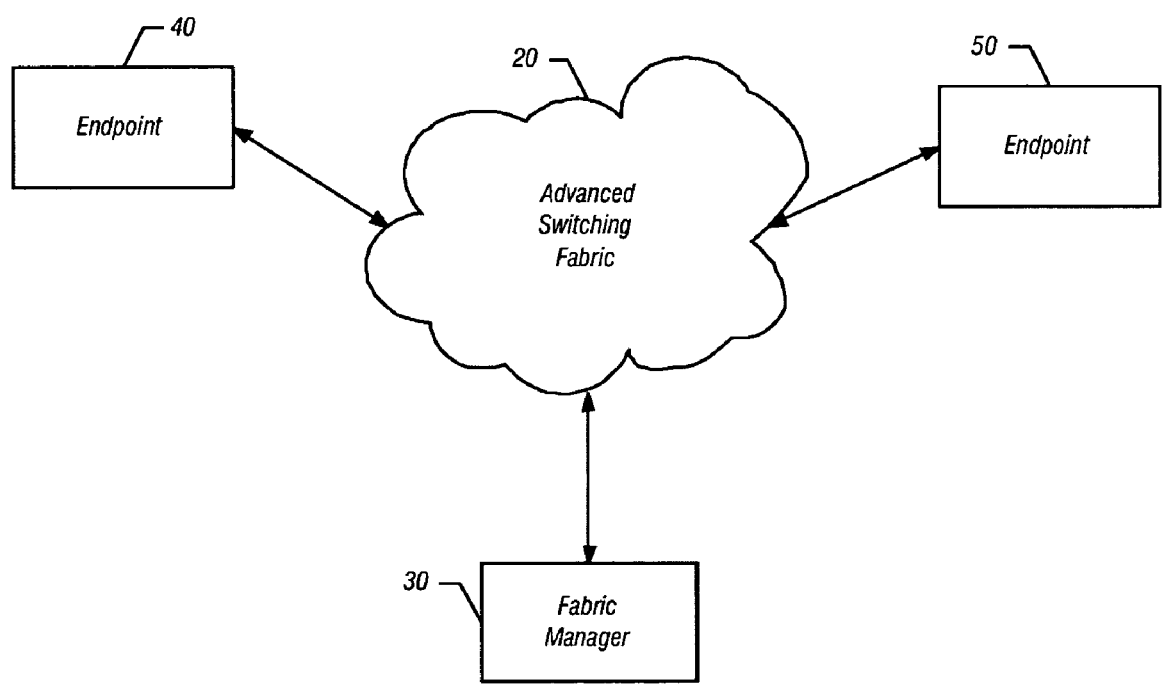
FIG. 1 is a block diagram of a system in accordance with one embodiment of the present invention.

Referring now to FIG. 1, shown is a block diagram of a system in accordance with one embodiment of the present invention. As shown in FIG. 1, system 10 may have an AS architecture to provide for peer-to-peer communications between endpoints of the system. As shown in FIG. 1, system 10 includes an AS fabric 20. AS fabric 20 may be used to link communications between various devices within system 10. Specifically, AS fabric 20 facilitates serial interconnects between devices coupled to the physical AS fabric components. As an example, AS fabric 20 may include dedicated AS switching devices, an active backplane with built-in AS switching functionality, a combination of the two, or other such devices.

As additionally shown in FIG. 1, system 10 includes a fabric manager 30. Fabric manager 30 may be any type of platform, i.e., a computing device, to operate fabric management software. Such a platform may include but is not limited to a server blade, telecom line card, storage device, Advanced Telecom Computer Architecture (ATCA) board, and the like. Fabric manager 30 may include components to manage data transfer through the fabric model. Fabric manager 30 may be responsible for various activities within system 10, including discovery and configuration of devices and management of the fabric according to a selected one of different fabric management models, including a centralized model, a decentralized model or a hybrid model, for example.

Still referring to FIG. 1, system 10 is shown to include a plurality of endpoints, including a first EP 40 and a second EP 50. Similar to fabric manager 30, EPs 40 and 50 may be any desired type of computing device. Furthermore, each EP 40 and 50 may include software components to facilitate serial communications between the devices of system 10.

To enable features of system 10, software to configure and manage the fabric of AS components may be used. In accordance with an embodiment of the invention, an AS software architecture may be implemented via a distributed set of components. Each component is specialized to perform a task or set of related tasks. This modular scheme allows software components to be invoked as certain functionality is desired. Components or sub-components may be an application running on an operating system (OS), an embedded application running with or without an OS, a component of an OS kernel, an OS driver, a firmware-based component, or the like. Certain software components may be embodied as applications running in the user space of an operating system, while other components are embodied as OS kernel space components. Such software components may be executed by one or more processors provided by a respective platform.

Figure 2:
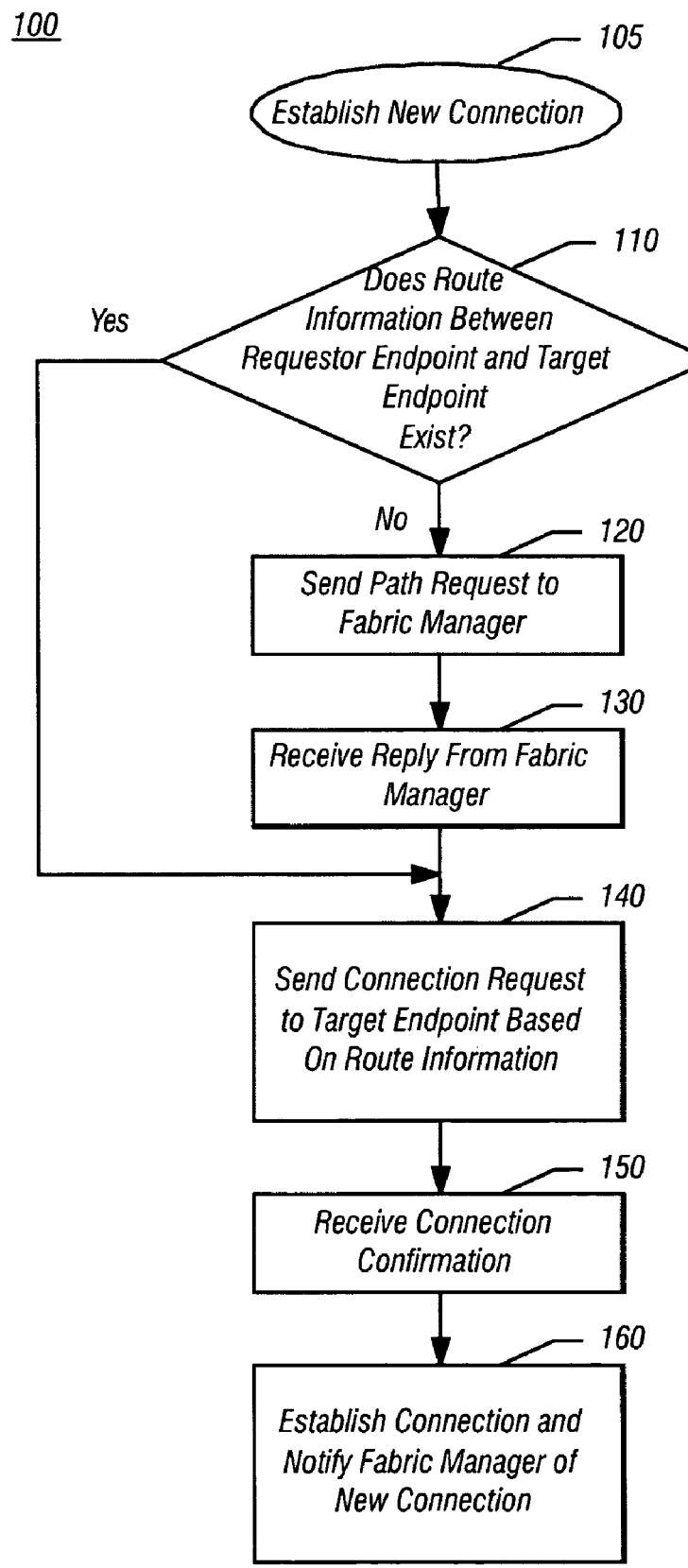
FIG. 2 is a flow diagram of a method for establishing a new connection between endpoints of a serial-based interconnect system in accordance with an embodiment of the present invention.

Referring now to FIG. 2, shown is a flow diagram of a method for establishing a new connection between endpoints of a serial-based interconnect system in accordance with an embodiment of the present invention. As shown in FIG. 2, method 100 may be a software routine initiated at oval 105. First, it may be determined whether a route between a requestor EP and a target EP exists (diamond 110). That is, the requester EP may query a connection list within itself to determine whether route information is present within the connection list. Such a connection list may be used to identify and describe a route for any existing connections between the requestor EP and other peer EPs. In some embodiments, the connection list may be stored in a cache memory, a dynamic random access memory (DRAM), or other such storage device. In other embodiments, the route information may be stored in another location associated with the requestor endpoint. The route information may correspond to a most direct or efficient route between the requestor EP and the target EP as determined by, for example, a fabric manager during a device configuration stage.

If no such route information is found for the target EP, a path request may be sent to the fabric manager (block 120). For example, such a lack of route information may exist if this is to be the first connection established between the requestor EP and the target EP. The path request sent to the fabric manager may include the target EP's unique identifier (T_UID). Of course, additional information may be included in the request, including the identification of the requestor EP, among other information.

The fabric manager keeps a record of each peer-to-peer connection established in its fabric. When the fabric manager receives notification of a new connection, it creates a new entry in its connection list. This entry is removed when the fabric manager receives a request to remove a connection or it determines that one or both peers are no longer members of the fabric. In one embodiment, the connection list is a dynamic data structure implemented as a linked list.

At block 130, a path response may be received from the fabric manager. Such a response may indicate that the target EP was not found. In such instance, the method may abort. If instead the target EP was found, route information may be provided to indicate the route between the requestor EP and the target EP. The route information may be stored in the connection list of the requestor EP.

Next, a connection request may be sent to the target EP from the requestor EP (block 140). As shown in FIG. 2, the connection request may be sent directly to the target EP from the requestor EP based on route information previously present in the requesters EP's connection list (determined at diamond 110), effectively skipping blocks 120 and 130. Alternately, the request may be sent after receipt of the route information provided in block 130 from the fabric manager.

In one embodiment, a simple load store (SLS) protocol may be used for peer-to-peer communications in an AS environment. The SLS protocol supports memory-to-memory communication between endpoints. SLS is a native AS protocol interface, and does not assume any particular protocol at the endpoints. Accordingly, requestor and target endpoints are responsible for translating between the SLS protocol and a local bus protocol. In such manner, SLS provides a standard transport mechanism for different memory-mapped protocols to directly communicate with each other. Data transfer between peer endpoints may occur rapidly using an SLS mechanism, which is based on a direct memory access (DMA) protocol. That is, an SLS protocol may allow for direct reading or writing of data from or to a selected memory source.

In one embodiment, an SLS data packet may be encapsulated in an AS header. The AS header allows the tunneled SLS data packet to travel to its destination without any translation at intermediate hops. The tunneled SLS packet includes an SLS header and data. The SLS packet header for a write or read request may contain a target aperture identifier, an offset and/or other address information, and optionally an access key, among other information. The SLS aperture may correspond to a block of memory, and may be identified by an initial base address indicating the aperture, as well as an offset into the aperture, in certain embodiments. SLS target apertures may be defined by registers in configuration information of the target endpoint. The aperture identifier of an SLS header may select a given aperture at the SLS target. The SLS target aperture may define the checks and operations to be performed in a received SLS packet as it is translated onto the local bus. Such operations may include path identifier checks, access key checks, offset limit checks, and address translations, for example. For example, there may be various aperture-specific checks an SLS target performs on read request and write packets. Additionally, there may be a set of optional checks that are applied at the discretion of the aperture implementer. Such checks may include a sequence number check, a transaction number check, an aperture protection check, and a multicast group index check, depending on the SLS packet type/format (e.g., read, sequenced write, etc.).

In one embodiment, a connection request to a target EP may include SLS aperture information if the requestor EP is the aperture owner. Furthermore, a connection identifier (ID) and a service type may also be sent. The connection ID may be an identification of the connection between the requester EP and the target EP, while the service type may indicate a type of transaction to occur via the connection.

Upon receipt of a connection request, the target EP may extract attribute and connection data from the request. The target EP then determines if it can and/or is willing to accept the connection. For example, if the request specifies an unsupported packet size or unsupported service, a connection may be refused. A connection may also be refused for other reasons, such as for traffic policy considerations. Further, the target EP may refuse a connection if no aperture memory is available for a new connection (where the target EP is the aperture owner).

In turn, the requestor EP may receive a connection confirmation from the target EP (block 150). Such a confirmation may be a refusal message, indicating that the connection is refused for some reason as discussed above. Instead, if the connection is accepted, the connection confirmation will include an accepted message. Furthermore, if the target EP is the owner of the SLS aperture, aperture information may be provided, along with a confirmation of the connection ID and service type.

If the connection has been accepted via the connection confirmation (at block 150), the connection may be established and the fabric manager may be notified of the new connection (block 160). Specifically, on receipt of an accepted confirmation, the requestor EP may send the new connection information to the fabric manager. At this time, transactions may occur between the requestor EP and target EP through the established connection. For example, the transaction may be the writing or reading of data between the requestor EP and the target EP.

In certain embodiments, the peer-to-peer connection may occur via an SLS protocol. That is, an AS header may be appended onto an SLS packet to thereby encapsulate the underlying packet for transmission through an AS fabric. The AS header may include various AS configuration information used to forward the tunneled encapsulated packet from the requestor EP to the target EP.

Figure 3:
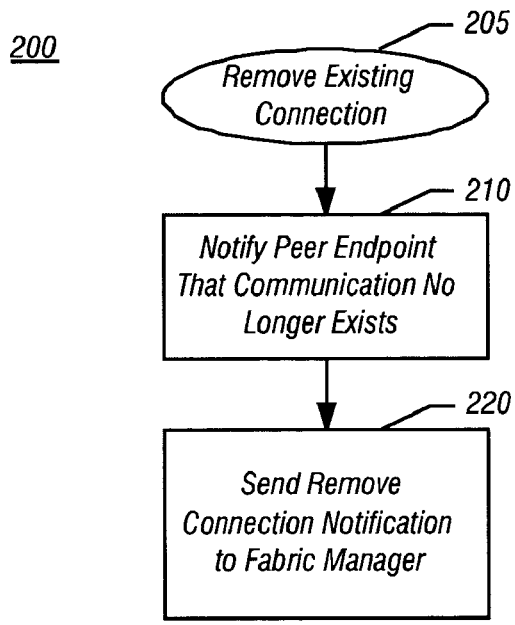
FIG. 3 is a flow diagram of a method of removing an existing connection in accordance with one embodiment of the present invention.

Referring now to FIG. 3, shown is a flow diagram of a method of removing an existing connection in accordance with one embodiment of the present invention. There are various circumstances under which connections may be closed. For example, after a data transaction is completed, the requesting EP may desire to close the connection. However, there are also situations where connections may remain open between active uses. Connections may also be closed in response to detected conditions. In one embodiment, the same format is used when either an endpoint wishes to stop a peer-to-peer session or when the fabric manager determines that one of the peers is no longer capable of participating in the connection.

As shown in FIG. 3, method 200 may be a software routine initiated at oval 205. When an endpoint, either a requestor EP or a target EP, determines that an existing connection is no longer desired, one peer endpoint (i.e., an initiating EP) may notify the other peer EP (i.e., a receiving EP) that the connection no longer exists (block 210). Such a notification may take the form of a close connection request, in one embodiment. Furthermore, the initiating EP may also send a remove connection notification to the fabric manager (block 220). Thus, both the fabric manager and the peer EPs may remove the associated connection information from their respective connection lists. In such manner, accurate and updated information regarding connections between EPs may be maintained.

Figure 4:
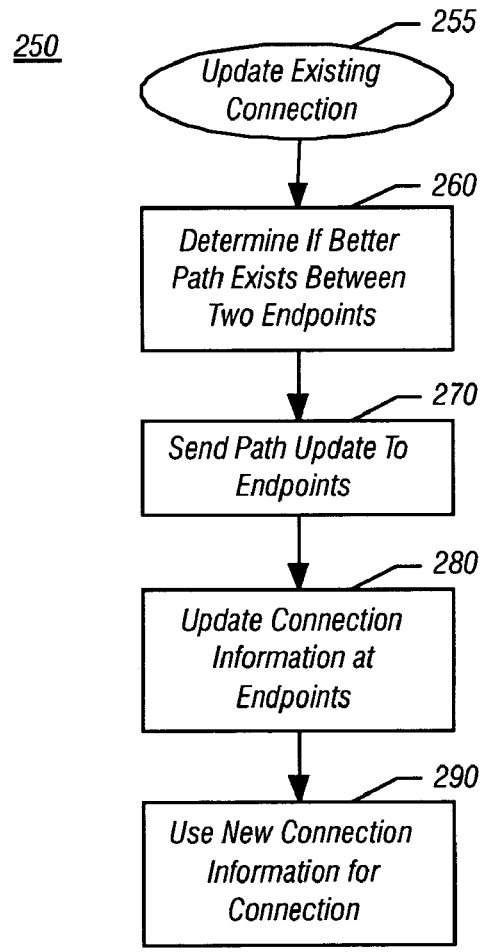
FIG. 4 is a flow diagram of a method for updating an existing connection in accordance with an embodiment of the present invention.

Referring now to FIG. 4, shown is a flow diagram for updating an existing connection in accordance with an embodiment of the present invention. As shown in FIG. 4, method 250 may be a software routine initiated at oval 255. First, it may be determined whether a better (or different) path exists between two endpoints (block 260). A fabric manager may find that such a new path exists between two EPs due to various events. For example, a different path may be needed in the case of a link up/link down event. Further, during ongoing operations, the routing topology of the system may change. For example, new cards or boards may be added to a system using a hot install, or existing cards or boards may be removed. In response, the fabric manager may determine that a better path exists between the peer-to-peer connection participants.

When such a new path is discovered, route information corresponding to the new path may be stored in the connection list of the fabric manager. Furthermore, the fabric manager may send a path update to the associated EPs (block 270). The path update may include information such as the peer's unique identifier and new turn pool and turn pointer information. Such turn pools are a source-based routing mechanism that enable flexible data routing in a variety of system topologies. Turn pools contain routing information that is relative to the system topology as provided by the source. Therefore, as a packet travels through multiple switches in a system, the destination of the packet does not have to be resolved through destination-based lookups at each hop. This reduces complexity and minimizes latencies during data transfers.

Based on the updated path information, each of the EPs may update the connection information for the corresponding connection in its connection list (block 280). Such updating of path information may occur dynamically throughout system operation. Accordingly, if a path is updated during an open connection between the EPs, upon receipt of new path information, the new information is used for an existing connection between the EPs (block 290).

Figure 5:
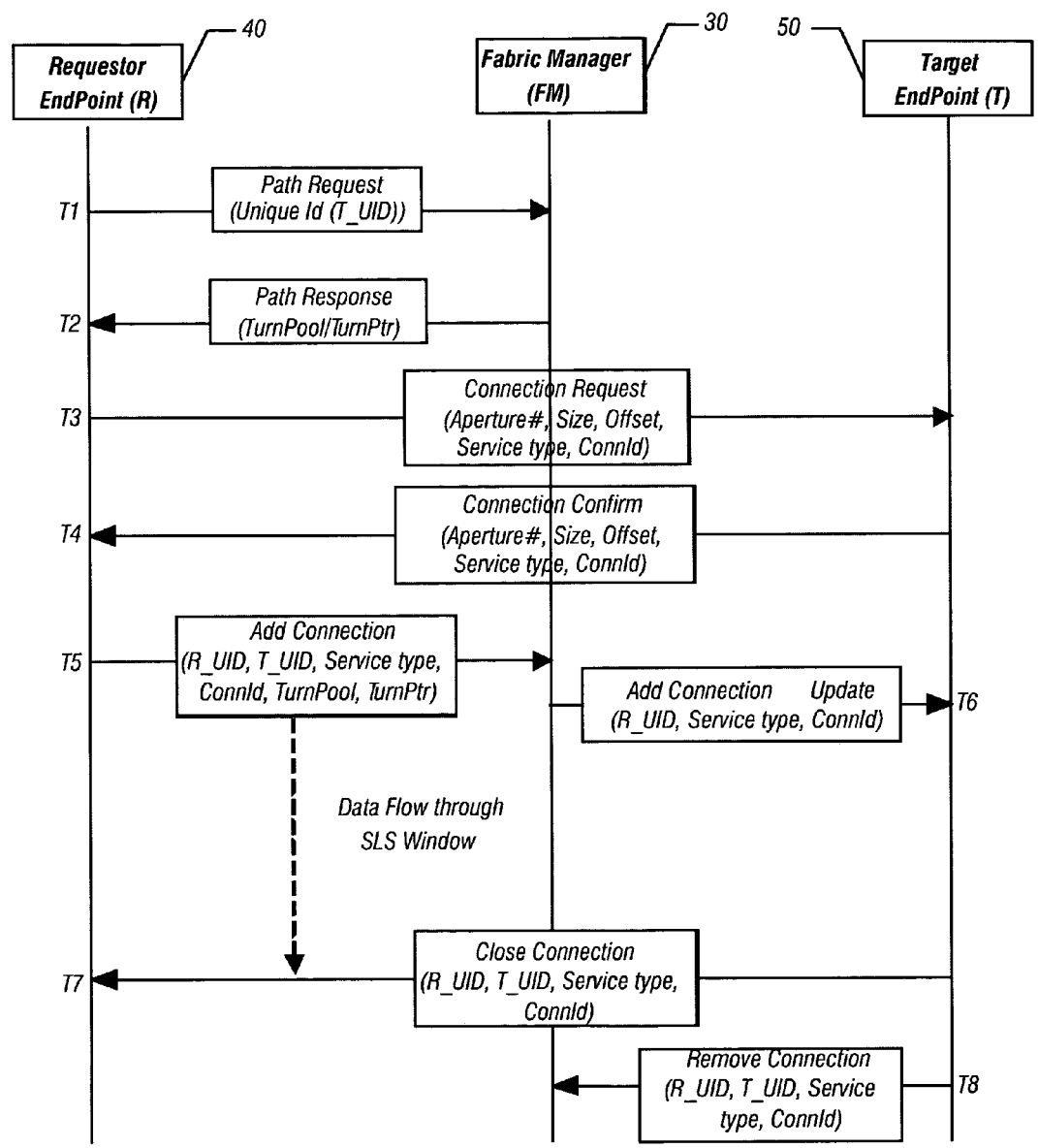
FIG. 5 is a timing diagram showing peer-to-peer connection flow in accordance with one embodiment of the present invention.

Referring now to FIG. 5, shown is a timing diagram detailing peer-to-peer connection flow in accordance with one embodiment of the present invention. As shown in FIG. 5, a sequence of actions (e.g., messages) taken to establish and remove a connection are shown. However, it is to be understood that in various embodiments only a limited number of such message exchanges may occur, especially where path information between a requestor EP 40 and a target EP 50 is already present in a connection list for requestor EP 40.

As shown in FIG. 5, at a first time T1, a Path Request may be sent from requestor EP 40 to a fabric manager 30. In the Path Request, a T_UID for the target EP 40 may be sent along with a query for a path to target EP 50.

At time T2, fabric manager 30 sends a Path Response that includes a turn pool/turn pointer for requester EP 40 to reach target EP 50. In various embodiments, an error message may be sent if no route between the EPs is found. It is to be understood that in various embodiments the messages sent at times T1 and T2 need not be sent if valid route information between requestor EP 40 and target EP 50 is present in a connection list of requestor EP 40.

Assuming that valid route information is provided to requestor EP 40, next at a time T3, a Connection Request may be sent from requestor EP 40 to target EP 50. Such request may include an aperture number, size, offset and service type, and a connection identifier. Furthermore, in various embodiments, the Connection Request may further include an aperture access key and a read/write status. The service type may indicate a type of service for which a connection is requested. For example, each EP may support different service types, such as voice, data, video and the like. Each service type may have a list of attributes associated with it, based on which an EP may determine whether it desires to support that service.

In turn, target EP 50 may, at a time T4, send a Connection Confirm message. Such a confirmation confirms the connection establishment and may include a service type, connection identifier, aperture number, size, read/write status and an aperture access key. In one embodiment, if the requestor EP is the owner of the SLS aperture (i.e., maintains it locally), the SLS aperture is allocated on receipt of the Connection Confirmation from the target EP. The requestor EP may check for aperture availability and reserve the aperture before sending the Connection Request. If instead, the target EP is the owner of the SLS aperture (i.e., maintains it locally), the SLS aperture is allocated on receipt of the Connection Request prior to sending the Connection Confirmation to the requestor EP.

At a time T5, an Add Connection message may be sent from requestor EP 40 to fabric manager 30. Such a message may include a unique identifier for both nodes, together with route information to reach target EP 50 from requester EP 40. Further information to be passed may include the service type and connection identifier information. Fabric manager 30 may store this information in a database. More specifically, the information may be stored in the connection list of fabric manager 30.

If requestor EP 40 is the owner of the aperture that is the subject of the connection, at a time T6 fabric manager 30 may notify the target EP 50 via an Add Connection Update message that requestor EP 40 was able to create the SLS aperture and data communication may begin. This message may include the unique identifier of the requestor, along with the service type and the connection identifier.

At this time, data transfer between requester EP 40 and target EP 50 may occur. As discussed above, in various embodiments, such data flow may occur via a SLS protocol tunneled through an AS header. The tunneled data packets may thus be provided from or delivered to the target SLS aperture.

At a conclusion of data transfer, target EP 50, for example, may wish to close the connection. Accordingly, as shown at time T7, a Close Connection request may be sent from target EP 50 to requestor EP 40. Such a request may include the unique identifiers for both requestor EP 40 and target EP 50, along with an identification of the service type and connection identifier. Furthermore, to maintain an accurate status of existing connections, target EP 50 may also send a Remove Connection notification to fabric manager 30, as shown at time T8. The same information sent to requestor EP 30 via the close connection request may also be sent to fabric manager 30 via the Remove Connection notification, in one embodiment.

In such manner, a unicast connection may be established between peer endpoints using only a single message in each direction, i.e., a Connection Request and a Connection Confirm message. Furthermore, an additional message from the requestor EP to the fabric manager to inform the fabric manager of the connection may be exchanged (i.e., an Add Connection message). In a worst-case situation, where route information for the peer endpoints has not been previously established and stored in the requestor EP, five messages may establish a peer-to-peer connection. The additional two messages may provide for a path request and a path response between the requesting EP and the fabric manager.

The connection management techniques disclosed herein may be implemented in modular systems that employ serial-based interconnect fabrics, such as PCI Express™ components. For example, PCI Express™ components may be employed in blade server systems and modular communication systems, such as ATCA systems.

In a blade server system one or more switch fabric cards and a management switch card may be present. Generally, a switch fabric card is used to perform switching operations for the serial-based interconnect fabric. The management switch card provides a management interface for managing operations of the individual blades. The management card may also function as a control card that hosts a fabric manager.

Figure 6:
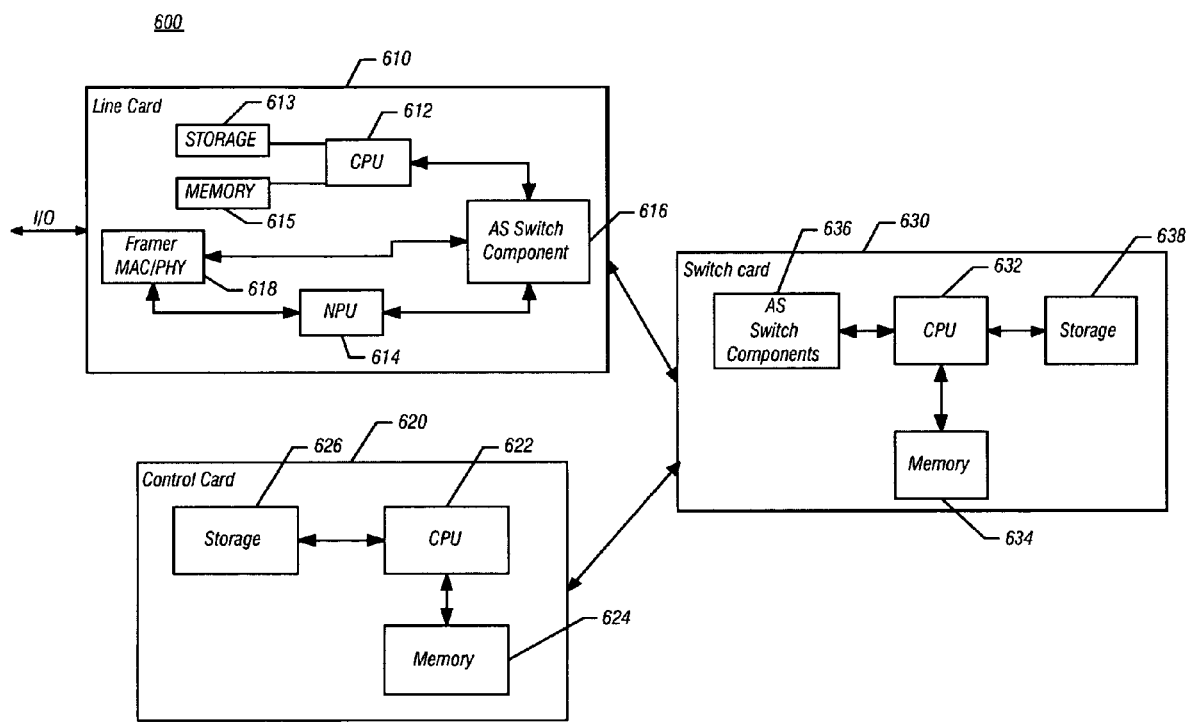
FIG. 6 is a block diagram of a communications implementation of one embodiment of the present invention.

Referring now to FIG. 6, shown is a communications implementation of one embodiment of the present invention. As shown in FIG. 6, system 600 includes a line card 610, a switch card 630, and a control card 620. Switch card 630 may be representative of an AS fabric, such as AS fabric 20 shown in FIG. 1. Switch card 630 may be used to support the AS switch fabric functionality. As shown in FIG. 6, switch card 630 may include AS switch components 636 that control switching of communications between various endpoints of system 600. Furthermore, switch card 630 includes a central processing unit (CPU) 632 coupled between AS switch components 636 and a memory 634. Switch card 630 may also include a storage medium 638, such as a nonvolatile memory device that includes one or more software components to handle switching of data communications.

As further shown in FIG. 6, a line card 610 may be coupled to switch card 630 via a serial interconnect. As an example, line card 610 may correspond to an endpoint of the system, for example, requestor endpoint 40 of FIG. 1. While shown in the embodiment of FIG. 6 as including only a single line card, it is to be understood that multiple such line cards may be present, each comprising an endpoint of the system.

Line card 610 may be coupled to switch card 630 via an AS switch component 616. In turn, switch component 616 may be coupled to a CPU 612 and a network processing unit (NPU) 614. In turn, CPU 612 may be coupled to a storage 613 and a memory 615. In one embodiment, storage 613 may be a nonvolatile memory that includes one or more software components to handle management of data transmissions via a peer-to-peer protocol, such as an SLS protocol. As further shown in FIG. 6, NPU 614 may be coupled to a framer/media access control (MAC) component, and physical layer (PHY) component, collectively shown as a component 618. Such a component may be used to connect line card 610 to other locations via an I/O data link. Component 618 may also be coupled directly to AS switch component 616, for example, via an AS link.

Still referring to FIG. 6, control card 620 is shown to include a CPU 622, coupled between a memory 624 and a storage 626. In one embodiment, storage 626 may be a nonvolatile memory to store one or more software components used to handle fabric management duties.

While shown with the particular components present in FIG. 6, it is to be understood that in various embodiments, a system having a peer-to-peer communication architecture may include other devices and the components of system 600 are shown for purposes of example. In some embodiments, the functionalities of one or more endpoint devices, fabric manager, and even AS fabric may be implemented within a single platform or portion thereof.

Embodiments may be implemented in a computer program that may be stored on a storage medium having instructions to program a system to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
storing route information for a first connection between a first endpoint and a second endpoint in a storage of the first endpoint, the first and second endpoints of different protocols, the route information determined during a configuration process;
establishing the first connection between the first endpoint and the second endpoint based on the route information;
dynamically determining a new path between the first endpoint and the second endpoint, dynamically transmitting a path update corresponding to the new path to the first endpoint and the second endpoint;
updating the route information based on the path update in the first and second endpoints and continuing the first connection using the updated route information; and
transmitting data through the first connection according to a simple load store (SLS) protocol in which a tunneled SLS packet is encapsulated in an Advanced Switching (AS) header, the tunneled SLS packet including a target aperture identifier and an offset, wherein the target aperture is associated with a direct memory access (DMA) window of the connection.

2. The method of claim 1, wherein continuing the first connection comprises receiving a connection confirmation from the second endpoint.

3. The method of claim 1, further comprising forwarding aperture information for a second connection to the second endpoint.

4. The method of claim 1, further comprising:
receiving notification at the first endpoint of modified route information from a fabric manager.

5. A method comprising:
determining if route information between a first endpoint and a second endpoint of a network coupled via a fabric controlled by a fabric manager is present in a storage of the first endpoint received from the fabric manager during a configuration process;
directly establishing a peer-to-peer connection between the first endpoint and the second endpoint using only a first message from the first endpoint to the second endpoint and a second message from the second endpoint to the first endpoint if the route information is present; and
transferring data between the first endpoint and the second endpoint through a direct memory access (DMA) window, wherein the first endpoint and the second endpoint are of different protocols and the DMA window comprises a simple load store (SLS) aperture comprising an initial address and an offset, and check and operation identifiers to be performed by the second endpoint, the SLS aperture encapsulated in an Advanced Switching (AS) header.

6. The method of claim 5, further comprising directly establishing the peer-to-peer connection without requesting route information from the fabric manager.

7. The method of claim 5, further comprising dynamically updating the route information while transferring the data.

8. An article comprising a machine-accessible storage medium containing instructions tat if executed enable a system to:
determine if route information between a first endpoint and a second endpoint of a network coupled via a fabric controlled by a fabric manager is present in the first endpoint;
directly establish a peer-to-peer connection between the first endpoint and the second endpoint using only a first message from the first endpoint to the second endpoint and a second message from the second endpoint to the first endpoint if the route information is present; and
transfer data between the first endpoint and the second endpoint through a direct memory access (DMA) window, wherein the first endpoint and the second endpoint are of different protocols and the DMA window comprises a simple load store (SLS) aperture encapsulated in an Advanced Switching (AS) header.

9. The article of claim 8, further comprising instructions that if executed enable the system to notify the fabric manager of the establishment of the peer-to-peer connection.

10. The article of claim 8, further comprising instructions that if executed enable the system to directly establish the peer-to-peer connection using only two messages between the first endpoint and the second endpoint, and then send a message regarding the peer-to-peer connection to the fabric manager.

11. An apparatus comprising:
a processor; and
a storage coupled to the processor to store instructions that if executed enable the processor to determine if route information between the apparatus and a target endpoint of a network coupled via a fabric controlled by a fabric manager is present in the apparatus, directly establish a peer-to-peer connection between the apparatus and the target endpoint using only a first message from the apparatus to the target endpoint and a second message from the target endpoint to the apparatus if the route information is present, and transfer data between the apparatus and the target endpoint through a direct memory access (DMA) window, wherein the apparatus and the target endpoint are of different protocols and the DMA window comprises a simple load store (SLS) aperture comprising an initial address and an offset and check and operation identifiers to be performed by the target endpoint, the SLS aperture encapsulated in an Advanced Switching (AS) header.

12. The apparatus of claim 11, further comprising an Advanced Switching (AS) component to couple the apparatus to an AS fabric via a serial interconnect.

13. The apparatus of claim 11, wherein the apparatus comprises a line card.

14. The apparatus of claim 11, further comprising a memory coupled to the processor having a plurality of simple load store (SLS) apertures to store the data.

15. The apparatus of claim 11, further comprising a memory coupled to the processor to store the route information.

16. A system comprising:

a first serial link;

a first endpoint coupled to a fabric via the first serial link, the first endpoint comprising a machine-accessible storage medium containing instructions that if executed enable the first endpoint to determine if route information between the first endpoint and a second endpoint is present in the first endpoint, the route information received from a fabric manager coupled to the first endpoint, establish a peer-to-peer connection between the first endpoint and the second endpoint, receive a path update corresponding to a new path between the first endpoint and the second endpoint from the fabric manager, update the route information based on the path update and continue the first connection using the updated route information; and the second endpoint coupled to the fabric via a second serial link, the second endpoint having a plurality of target apertures each defining checks and operations to be performed on an incoming packet, wherein the second endpoint is to receive a data transfer from the first endpoint by a simple load store (SLS) protocol, the data transfer including a packet header having a target aperture corresponding to one of the plurality of target apertures, wherein the target aperture is associated with a direct memory access (DMA) window of the connection.

17. The system of claim 16, further comprising an Advanced Switching (AS) component to couple the first endpoint to the fabric, the fabric comprising an AS fabric.

18. The system of claim 17, wherein the fabric manager is coupled to the fabric via a third serial link.

19. The system of claim 18, wherein the first endpoint further comprises instructions that if executed enable the first endpoint to request the route information from the fabric manager if the route information is not present in the first endpoint.

20. The system of claim 16, wherein data of the data transfer comprises information of the target aperture having an Advanced Switching (AS) header appended thereto.

21. The system of claim 16, wherein the first and second endpoints are of different protocols.

* * * * *

UNITED STATES PATENT AND TRADEMARK OFFICE
CERTIFICATE OF CORRECTION

PATENT NO. : 7,350,014 B2 Page 1 of 1
APPLICATION NO. : 10/982132
DATED : March 25, 2008
INVENTOR(S) : Randeep S. Kapoor and Mohamad Rooholamini It is certified that error appears in the above-identified patent and that said Letters Patent is hereby corrected as shown below:

Column 10:
Line 10, "tat" should be --that--.

Signed and Sealed this

Fifth Day of August, 2008

JON W. DUDAS
*Director of the United States Patent and Trademark Office*